(12) United States Patent
Miyake

(10) Patent No.: US 6,732,146 B1
(45) Date of Patent: May 4, 2004

(54) INFORMATION PROCESSING APPARATUS, INFORMATION PROCESSING METHOD, AND INFORMATION PROVIDING MEDIUM PROVIDING A CHANGEABLE VIRTUAL SPACE

(75) Inventor: Takahiro Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 687 days.

(21) Appl. No.: 09/603,070

(22) Filed: Jun. 26, 2000

(30) Foreign Application Priority Data

Jun. 29, 1999 (JP) ............................. P11-182681

(51) Int. Cl.[7] ............................................. G06F 15/16
(52) U.S. Cl. ........................................ 709/204; 709/103
(58) Field of Search ................................. 709/103, 204, 709/224, 232, 223, 226; 714/15

(56) References Cited

U.S. PATENT DOCUMENTS

| 6,031,549 A | * | 2/2000 | Hayes-Roth | 345/474 |
| 6,119,147 A | * | 9/2000 | Toomey et al. | 709/204 |
| 6,295,611 B1 | * | 9/2001 | Connor et al. | 714/15 |
| 6,418,458 B1 | * | 7/2002 | Maresco | 709/103 |

* cited by examiner

*Primary Examiner*—Zarni Maung
(74) *Attorney, Agent, or Firm*—Oblon, Spivak, McClelland, Maier & Neustadt, P.C.

(57) ABSTRACT

This invention provides means for constructing a changeful virtual space. A universal AO 41 generates a user manager 51, an object manager 52, and an agent manager 53 and then a user object 61, an object AO 71-1, and an agent AO 81. On the basis of a configuration file created by a user, Event1Managers 161-1 and 161-2 are generated. Further, Event1ObjectEntity 171-1, Event1AgentEntity 172-1, and Event1UserEntity 173-1 are generated.

11 Claims, 15 Drawing Sheets

FIG. 6

| MODEL | DESCRIPTION | REMARKS |
|---|---|---|
| BeginID | OBJECT START ID | OBJECT ID (USE OBJECTS IN A SERVER-SPECIFIED RANGE). |
| EndID | OBJECT END ID | SPECIFY THIS WHEN GENERATING A SAME TYPE OF OBJECT WITH DIFFERENT OBJECT ID. ESPECIALLY, IF NOT REQUIRED, SPECIFY A SAME VALUE AS Begin ID. |
| IDChange | OBJECT ID AFTER CHANGE | FOR EXTENSION. SPECIFY 0. |
| ObjName | NAME IN WORLD | ENCLOSE WITHIN DOUBLE QUOTATIONS LIKE "APPLE". |
| InvName | NAME OF OBJECT WHEN OWNED | IF ENCLOSED WITHIN DOUBLE QUOTATIONS, THE SAME AS ObjName. |
| Kind | KIND OF OBJECT WHEN OWNED | 1:FOOD, 2:RECYCLE, 3:EVENT, 4:SPECIAL, 5:MONEY, 6:ACCESSORY, 7:GOODS 3 OR 6 IS SPECIFIABLE. |
| Price | SALES PRICE IN SHOP | |
| Cost | PRICE AT RECYCLE | |
| Texture | TEXTURE ID | |
| Avatar Part | ACCESSORY ATTACHMENT POSITION FOR AVATAR | FOR AN OBJECT OF Kind=6, ACCESSORY IS ATTACHED TO ONE OF THE FOLLOWING SPECIFIED POSITION. 0:CHEST, 1:ARM, 2:HEAD FOR EXTENSION. SPECIFY 0. |
| Agent Part | ACCESSORY ATTACHMENT POSITION FOR AGENT | FOR AN OBJECT OF Kind=6, ACCESSORY IS ATTACHED TO ONE OF THE FOLLOWING SPECIFIED POSITIONS. 0:LEFT LEG, 1:LEFT WAIST, 2:FOREHEAD, 3:LEFT EAR, 4:FRONT OF EYE, 5:BELOW NOSE, 6:HEAD, 7:MOUTH FOR EXTENSION. SPECIFY 0. |
| Effect | EFFECT IMPARTING TIMING | FOR EXTENSION. SPECIFY 0. |
| Favorite | FAVORITE ATTRIBUTE | 0:LIKES ONLY DOG, 1:LIKES ONLY CAT, 2:LIKES BOTH DOG AND CAT, 3:LIKES NEITHER DOG NOR CAT. |
| Visible | VISIBILITY ATTRIBUTE | DISPLAYED OR NOT IN A PROPERTY LIST WHEN OWNED. (TRUE or FALSE) FOR EXTENSION. SPECIFY TRUE. |
| Discardable | DISCARD ATTRIBUTE | WHETHER USER CAN DISCARD THIS OBJECT OR NOT. (TRUE or FALSE) FOR EXTENSION. SPECIFY TRUE. |
| Place | PLACE OF SALE OR STORE | FOR EXTENSION. SPECIFY 9. |
| Season | SEASON OF SALE OR STORE | FOR EXTENSION. SPECIFY 9. |
| Time | TIME OF SCATTER | FOR EXTENSION. SPECIFY 0. |
| Fill | CHANGE IN DEGREE OF FULLNESS | CHANGE IN THE DEGREE OF FULLNESS WHEN THE AGENT AGENT HAS EATEN THIS OBJECT. |
| Expire | SECONDS UNTIL EXPIRATION | FOR EXTENSION. SPECIFY 0. |
| Class | CLASS FILE | SPECIFY BY A PACKAGED NAME. |
| IconFile | PROPERTY LIST ICON | FOR EXTENSION. SPECIFY NOTHING. |

F I G. 7

```
#/*------------------------------
#/*File:sample.EVENT
#*                                ------*/
*MODEL    START TIME        END TIME          CLASS NAME                       INITIAL VALUE
ONESHOT   1999.1.1 00:30 00  1999.1.1 12:30 00  developer.sample.SnowManEventManager  10
```

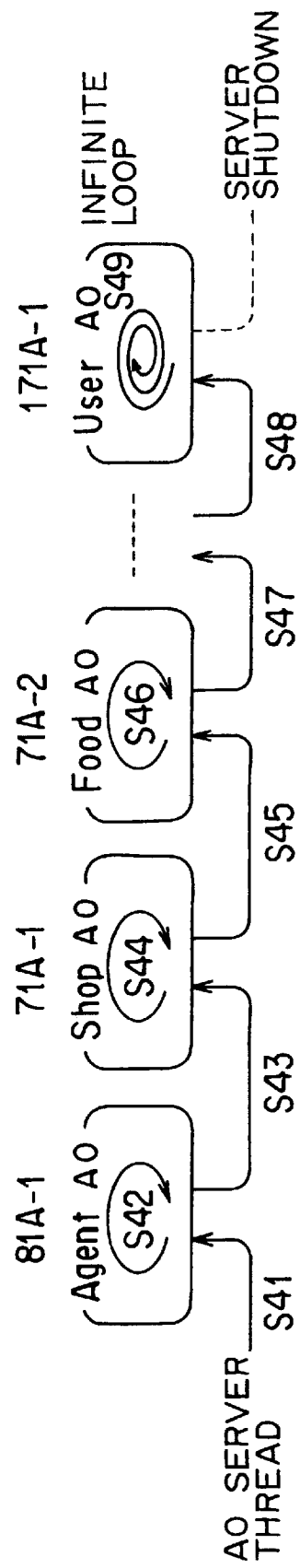
F I G. 12

F I G. 15 A
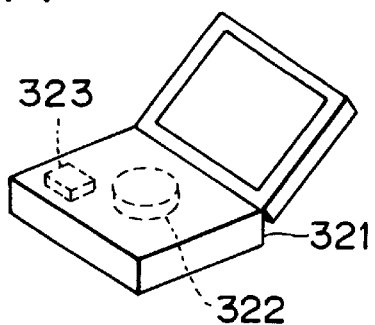
F I G. 15 B
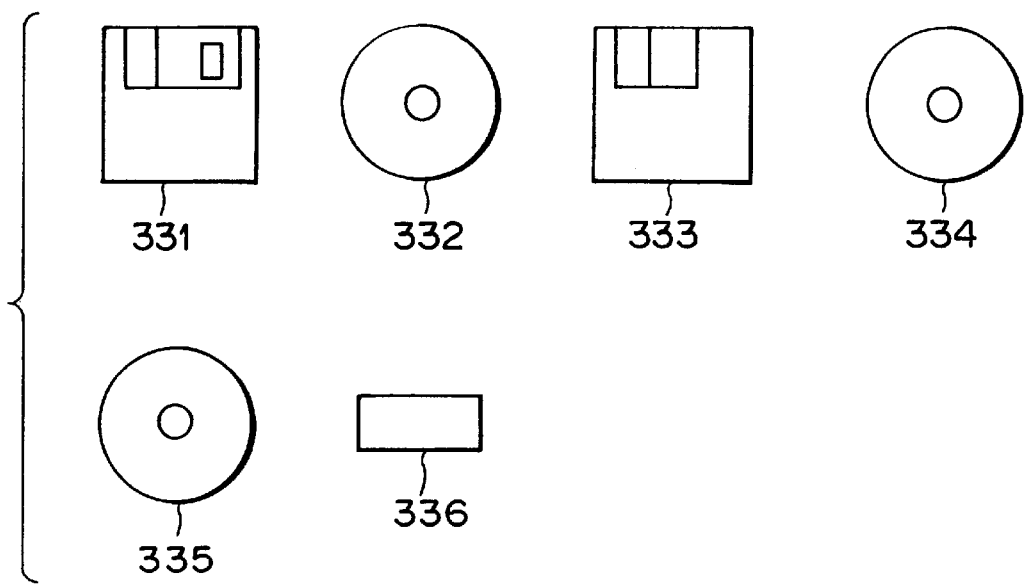
F I G. 15 C
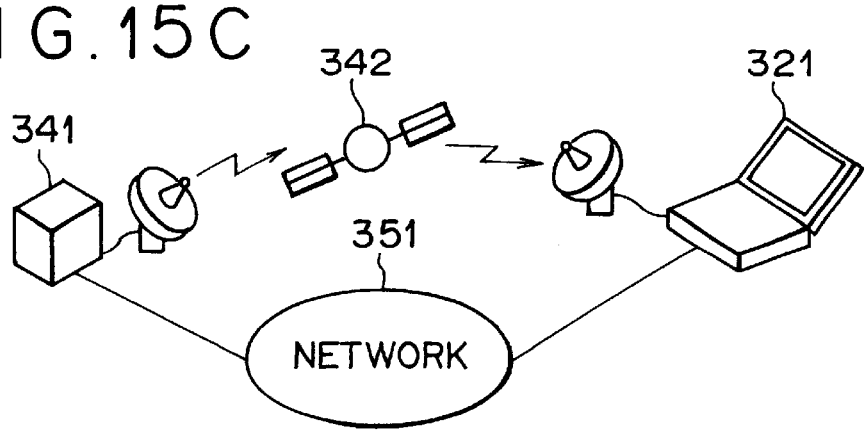

INFORMATION PROCESSING APPARATUS, INFORMATION PROCESSING METHOD, AND INFORMATION PROVIDING MEDIUM PROVIDING A CHANGEABLE VIRTUAL SPACE

BACKGROUND OF THE INVENTION

The present invention relates generally to an information processing apparatus, an information processing method, and an information providing medium and, more particularly, to an information processing apparatus, an information processing method, and an information providing medium that are adapted to provide a variety of shared virtual spaces.

Recent advances in computer and network technologies have been promoting widespread use of systems for allowing many users to share a common virtual space. In such a shared virtual space, every individual user can live a life through his or her avatar, or his or her embodiment or personification unique to that shared virtual space.

In the conventional shared virtual space systems, only the virtual spaces prepared by providers are provided, thereby presenting a problem of inability of providing virtual spaces that satisfy various user needs.

A virtual space that is changeful can be realized by its provider if it changes and updates the virtual space from time to time. However, this requires the provider to design programs for constantly changing the virtual space. Designing such programs is too burdensome for the provider in cost and time to realize this type of a virtual space. Consequently, the virtual space becomes obsolete as time goes by, losing its attractiveness.

SUMMARY OF THE INVENTION

It is therefore an object of the present invention to provide an information processing apparatus, an information processing method, and an information providing medium that are capable of providing a changeful virtual space with simplicity and reliability as with the case of a real space.

BRIEF DESCRIPTION OF THE DRAWINGS

These and other objects of the invention will be seen by reference to the description, taken in connection with the accompanying drawing, in which:

FIG. 6 is a table listing descriptions of an object file;

FIG. 7 shows descriptions of an event file;

FIG. 12 is a schematic diagram illustrating a thread of the AO server 22;

FIGS. 15A, 15B, and 15C are schematic diagrams illustrating information providing media.

DETAILED DESCRIPTION OF PREFERRED EMBODIMENTS

Figure 1:
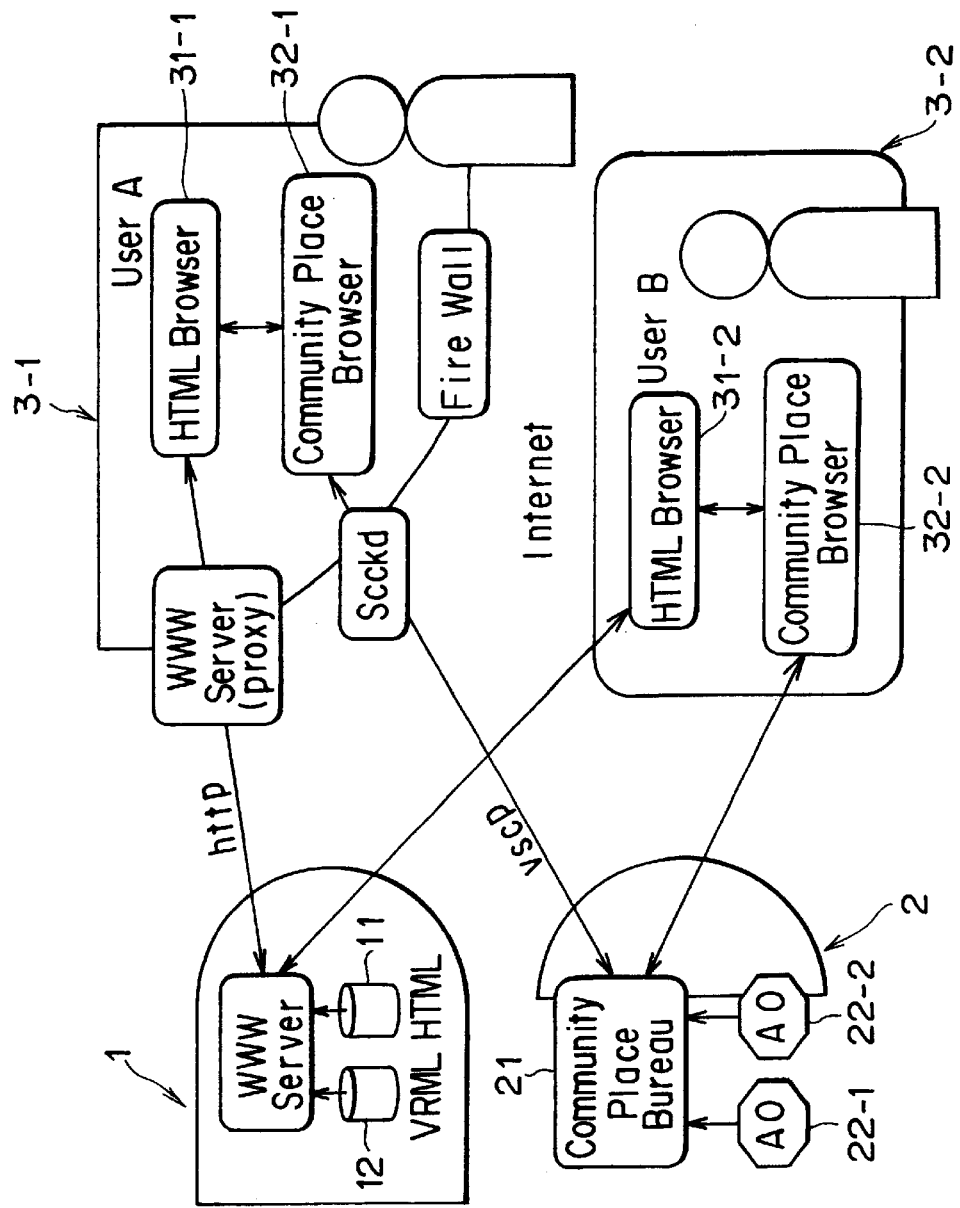
FIG. 1 is a schematic diagram illustrating an exemplary configuration of a virtual space providing system to which the present invention is applied.

This invention will be described in further detail by way of example with reference to the accompanying drawings. Now, referring to FIG. 1, a shared virtual space providing system according to the invention comprises a WWW (World Wide Web) server 1 and a CP (Community Place) (trademark) server 2 for example. The WWW server 1 has an HTML (Hyper Text Markup Language) file 11 and a VRML (Virtual Reality Modeling Language) file 12. The VRML file 12 includes descriptions of a virtual world and a shared application, a CP bureau 21 (of the CP server 2 to be described), and an address of a computer on which the system operates (in this case, the address of the CP server 2).

The CP server 2 has a CP bureau (Community Place Bureau) 21 and AO (Application Object) servers 22-1 and 22-2. The CPU bureau 21 is a server for managing a shared virtual space. The AO servers 22-1 and 22-2 provide a shared application development environment.

These WWW server 1 and CP server 2 are connected to plural terminals 3-1 and 3-2 through a network such as the Internet. The terminal 3-1 has an HTML browser 31-1 and a CP browser 32-1. The HTML browser 31-1 accesses the WWW server 1 and capture and display predetermined information. The CP browser 32-1 displays a virtual space for navigation.

Likewise, the terminal 3-2 has an HTML browser 31-2 and a CP browser 32-2.

When user A of the terminal 3-1 operates the same to enter a predetermined command, the HTML browser 31-1 accesses, through the Internet, the WWW server 1 specified by a predetermined URL (Uniform Resource Locator) to capture the VRML file 12. The HTML browser 31-1 passes the captured VRML file 12 to the CP browser 32-1. The CP browser 32-1 analyzes the VRML file 12 and displays it on the screen. If the address of the CP bureau 21 is specified in the VRML file 12, the CP browser 32-1 connects to the CP bureau 21.

When the connection is successful, the subsequent communication between the CP browser 32-1 and the CP bureau 21 is carried out by use of VSCP (Virtual Society Server Client Protocol) (trademark). VSCP has capabilities of informing the CP bureau of changes made by the user through the CP browser 32-1 and informing other CP browsers connected to the CP bureau 21 of the information about the changes.

Likewise, user B of the terminal 3-2 accesses the WWW server 1 to capture the VRML file 12. The CP browser 32-2 analyzes the captured VRML file 12 and displays the same on the screen.

Thus, plural users share a same virtual space.

The user who has accessed the virtual space is represented as his or her avatar. When a predetermined avatar (or a predetermined user) navigates through the virtual space, the operation of that avatar is reflected on other avatars sharing the virtual space. The information about avatar activities is sent from the CP browsers 32-1 and 32-2 to the CP bureau 21 by means of VSCP. The CP bureau 21 sends this information to other CP browser connected to the CP bureau 21. Each CP browser that receives this information updates the corresponding avatar so that the changes done on the CP browser of the source of the information are reflected.

The AO servers 22-1 and 22-2 (hereafter simply referred to as the AO server 22 unless distinction between them is necessary) exist independently of the CP bureau 21 and communicates therewith by use of VSAP (Virtual Society Application Protocol).

Figure 2:
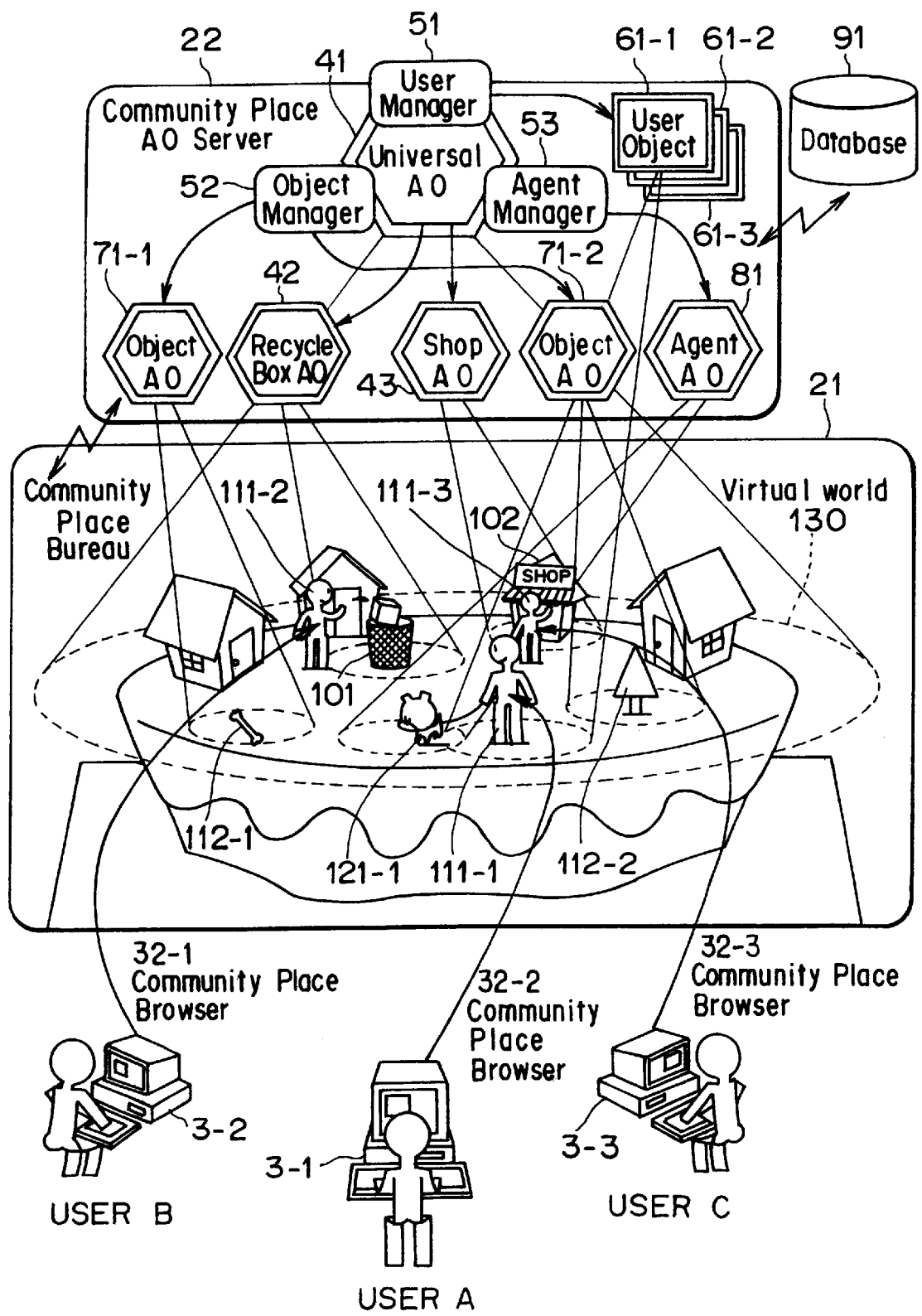
FIG. 2 is a schematic diagram illustrating the virtual space shown in FIG. 1.

As shown in FIG. 2, the AO server 22 has a universal AO 41. The universal AO 41 controls the virtual world in its entirety. An AO manages shared applications. A shared application denotes an application shared by users of whose substances and actions exist in a shared space.

In the example shown in FIG. 2, shared applications are a recycle box 101, a shop 102, an agent 121-1 expressed in a dog, an object 112-1 expressed in a bone, and an object 112-2 expressed in a tree which are shared in a virtual world 130 by avatars 111-1 through 111-3 corresponding to users A through C of the terminal 3-1 through 3-3. At starting of the system, the universal AO 41 reads a default configuration file (paw.conf) and, according to the contents described therein, generates a user manager 51, an object manager 52, and an agent manager 53.

The user manager 51 generates a user object 61 for every user when he or she has accessed the virtual world 130. In this example, the three users A through C are accessing the virtual world 130, so that three user objects 61-1 through 61-3 are generated. The user object 61-1 generates and manages an avatar 111-1 of the user A, the user object 61-2 generates and manages an avatar 111-2 of the user B, and the user object 61-3 generates and manages an avatar 111-3 of the user C. The AO server 22 is connected to a database 91 so that the information necessary for executing these types of processing from time to time can be read.

The agent manager 53 generates an agent AO 81 for every user. The agent AO 81 generates and manages an agent (in the example, a dog) 121 of each corresponding user. In FIG. 2, there is shown only one agent 121-1. Actually, in this example, three users are accessing the virtual world 130, so that three agent 121 are generated.

The user object 61 and the agent AO 81 are generated when the user accesses the virtual world 130 and erased when the user exits it.

On the contrary, a recycle box AO 42 and a shop AO 43 are generated by the universal AO 41 at a predetermined preset time and remain in the virtual world for a predetermined duration of time. The recycle box AO 42 generates and manages the recycle box 101 and the shop AO 43 generates and manages the shop 102.

The object manager 52 generates objects AO 71-1 and 71-2 at a predetermined preset time and keeps them to exist for a predetermined preset duration of time. In this example, the object AO 71-1 generates and manages the object 112-1, which is a bone, and the object AO 71-2 generates and manages the object 112-2, which is a tree.

The CP bureau 21 builds the virtual world 130. The CP browser 32 manages a predetermined range relative to the corresponding avatar 111 in the virtual world 130.

Now, referring to FIG. 3, an exemplary operation of the AO will be described. In this example, an operation is described in which, when a predetermined user operates the mouse of the terminal 3 to click the agent 121, which is a dog, the agent 121 barks.

The AO server 22, when connected to the CP bureau 21, requests in step S1 the CP bureau 21 for adding a shared application (a shared substance) managed by the AO server 22 to the virtual world 130 managed by the CP bureau 21. In step S2, the CP bureau 21 sends the request by the AO server 22 to all CP browsers 32 connected to the CP bureau 21. Receiving the request, each CP browser 32 makes a corresponding shared application to appear.

For example, if the user A clicks the agent 121 in step S3, a corresponding script starts in the browser 32-1 in step S4. In step S5, the started script sends a message to the CP bureau 21 indicating that the agent 121 has been clicked. In step S6, the CP bureau 21 sends this message to the AO server 22 which manages the selected agent 121.

In step S7, the AO server 22 executes processing corresponding to the received message. In step S8, the AO server 22 sends a message indicative of the result of the executed processing to the CP bureau 21. In this example, this message causes the agent 121 to bark. In step S9, this message is passed from the CP bureau to the corresponding agents 121 through all browsers 32, and then processed.

Figure 4:
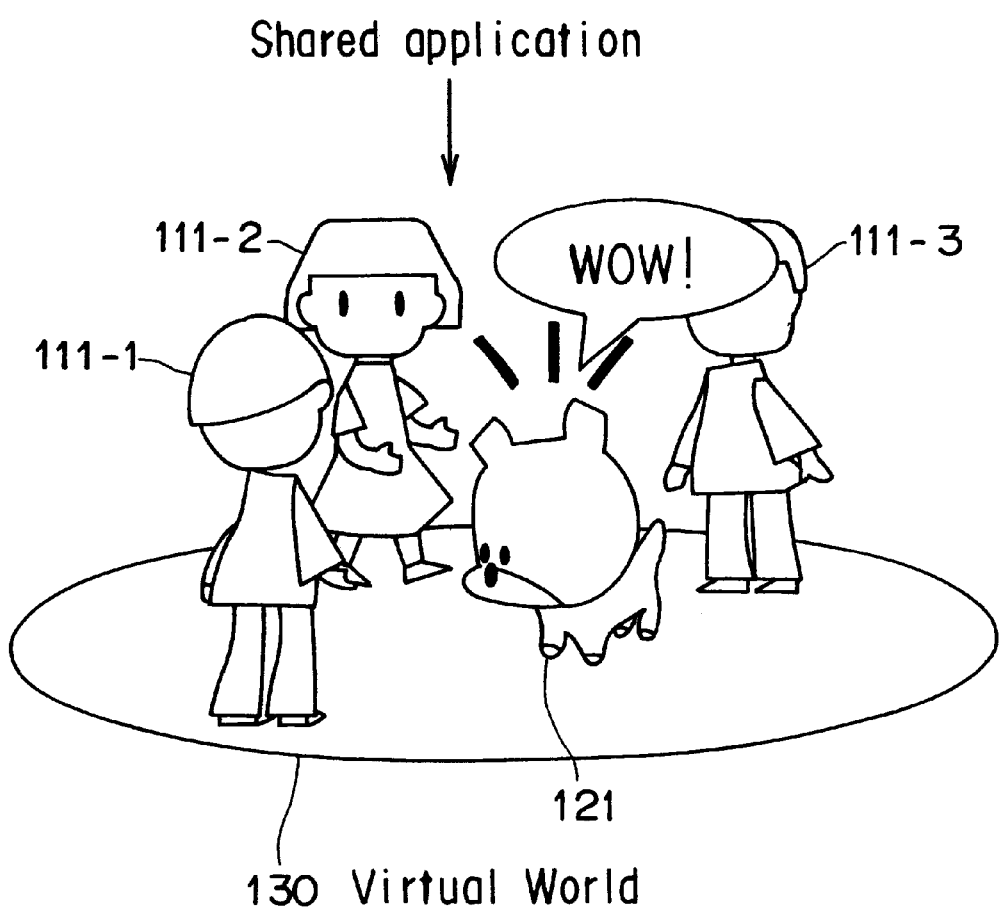
FIG. 4 is a schematic diagram illustrating a shared application.

Consequently, as shown in FIG. 4, the agent 121 barks "Wow".

Figure 3:
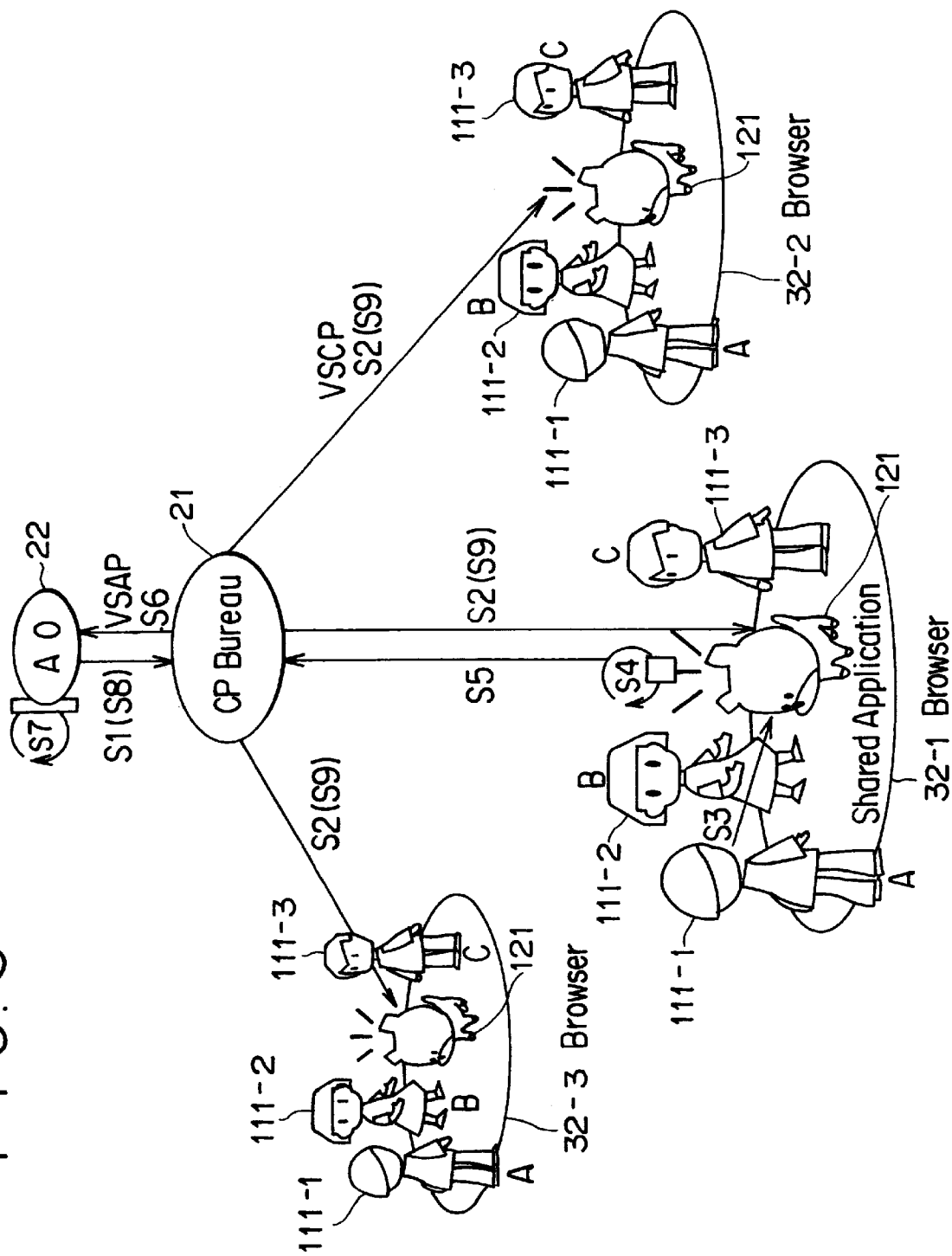
FIG. 3 is a schematic diagram illustrating operations of a CP bureau 21 and an AO server 22 shown in FIG. 1.
Figure 5:
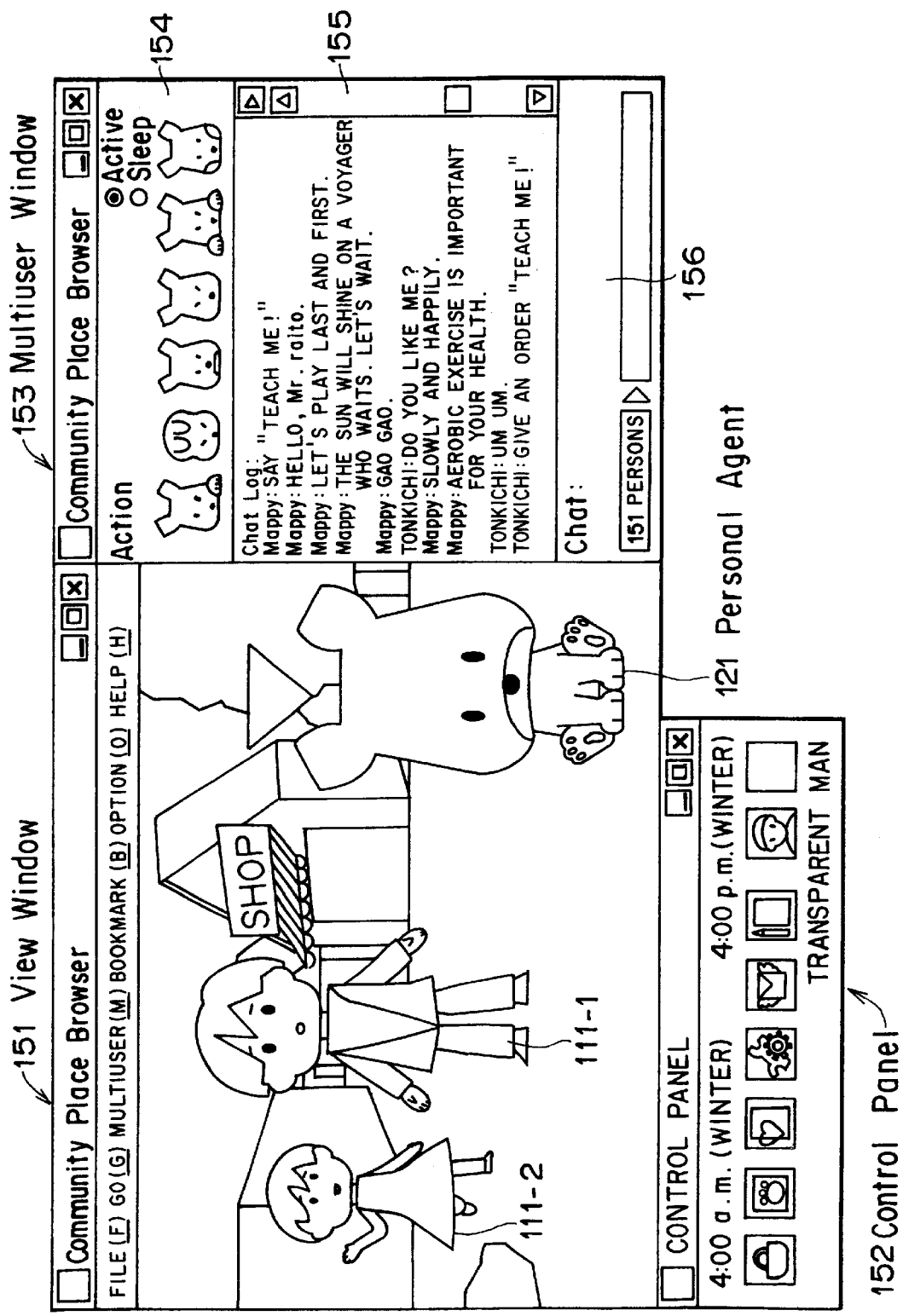
FIG. 5 is a display screen depicting an exemplary display of a terminal 3-1 shown on FIG. 1.

In FIGS. 2 and 3, the virtual world 130 is shown for an entire view. In the terminal 32 of each user, however, an image as shown in FIG. 5 is shown for example. A view window 151 shows a predetermined range of the virtual world 130 relative to the position of the avatar of that user. In this example, the avatars 111-1 and 111-2 and the agent 121 are shown.

Below the view window 151, a control panel 152 is displayed. The user can select various icons displayed on the control panel to make various actions in the virtual world 130.

To the right of the view window 151, a multiuser window 153 is displayed. The multiuser window 153 has action buttons 154 for making the agent 121 execute various actions. Below these action buttons, a chat log box 155 is arranged in which a text log of chats made with other users or agents 121 is displayed. Below the chat log box 155, a display area 156 for a chat message entered at that time is arranged.

The above-mentioned universal AO 41, the user manager 51, the object manager 52, and the agent manager 53 are prepared by the provider of the virtual space and used on the server side. In the present invention, a general user other than the virtual world provider (on the server side) also can provide a desired event to the virtual world 130. A user who desires to provide an event generates a configuration file describing the basic information about that event and the data necessary for that event and supplies the configuration file and the necessary data to the manager of the AO server 22.

This configuration file is composed of an object file (a file named as xxx.OBJECT) for describing an object that occurs in that event and an event file (a file named as yyy.EVENT) for describing the time information for example of that event. The object file describes various pieces of information such as the ID (Begin ID) of an object to be generated at the time of event, the name (ObjName) of that object, and a sale price (Price) at the shop as shown in FIG. 6. The event information describes arguments such as the start time (1999.1.1 00:30:00) and end time (1999.1.1 12:30:00) of that event, the name (class name) (developer.sample.SnowManEventManager) of the manager to be started, and the initial value (10) to be passed to the started manager as shown in FIG. 7.

Figure 8:
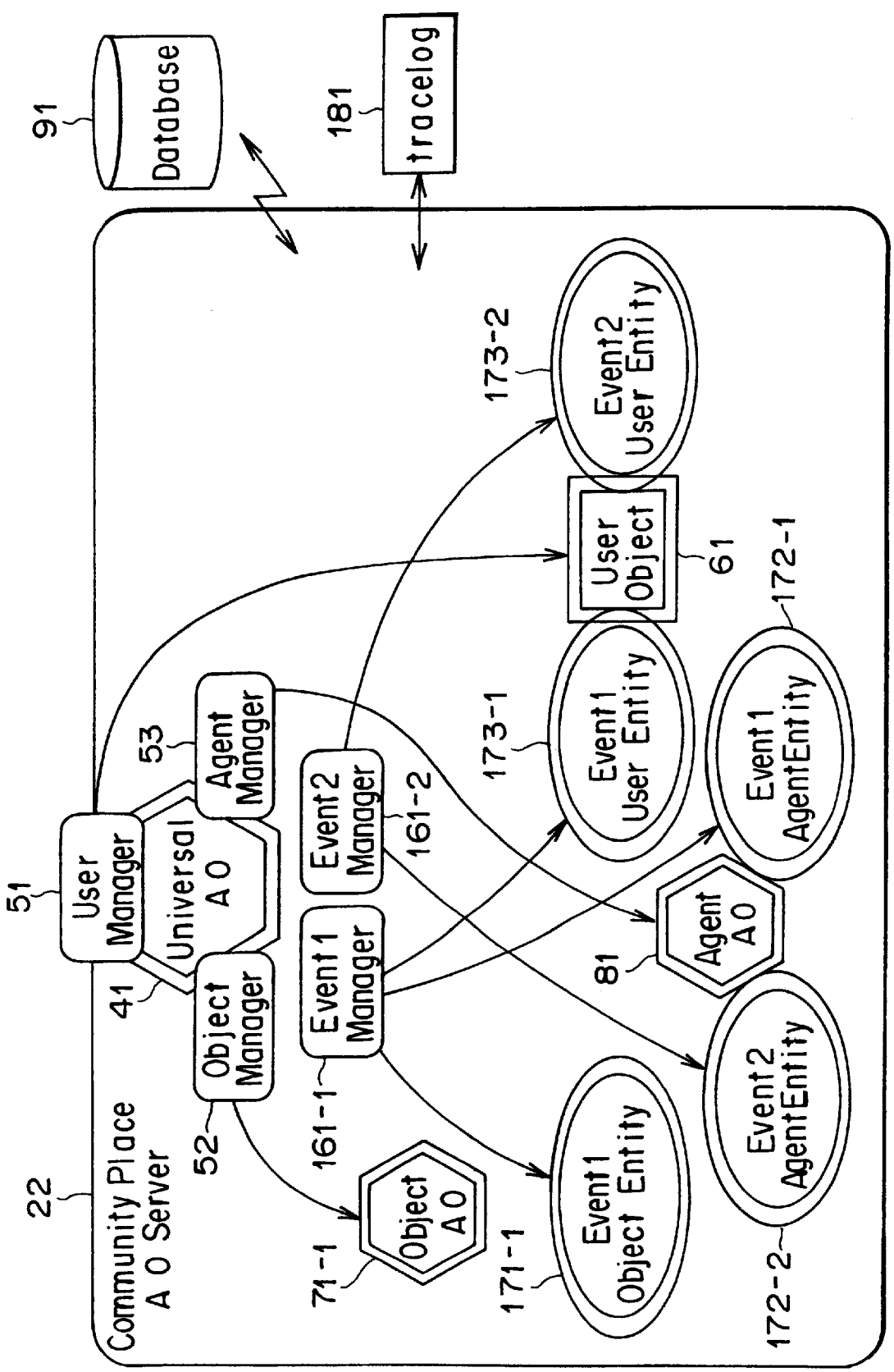
FIG. 8 is a schematic diagram illustrating AO server processing.

When the AO server 22 receives the above-mentioned configuration file generated by the user, the universal AO 41 analyzes the received file to generate an event manager (EventManager) according to the result of the analysis as shown in FIG. 8. In this example, two, events, Event 1 and Event 2, are provided, so that Event1Manager 161-1 and Event2Manager 161-2 are generated. These EventManagers are generated when the event is started as described in the above-mentioned event file (yyy.Event).

According to the contents described in the above-mentioned object file (xxx.OBJECT), the Event1Manager 161-1 generates an Event1ObjectEntity 171-1, an Event1AgentEntity-172-1, and an Event1UserEntity 173-1. The Event1ObjectEntity 171-1 describes an object that is generated and managed in the virtual world 130 during the event. The Event1AgentEntity 172-1 describes a relationship between the agent (the dog) 121 existing in the virtual world 130 during the event and that event. The Event1UserEntity 173-1 describes a relationship between the user (the avatar 111) existing during the event and that event.

Likewise, in this example, the Event2Manager 161-1 generates an Event 2 agent entity 172-2 and an Event 2 user entity 173-2. These entities describe the relationships between Event 2 and agent and between Event 2 and user (avatar) respectively.

In addition, in this example, a trace log (tracelog) 181 is connected to the AO server 22. The trace log 181 records the trace of the thread at the time of the event. Details of the trace log 181 will be described with reference to FIG. 13.

Figure 9:
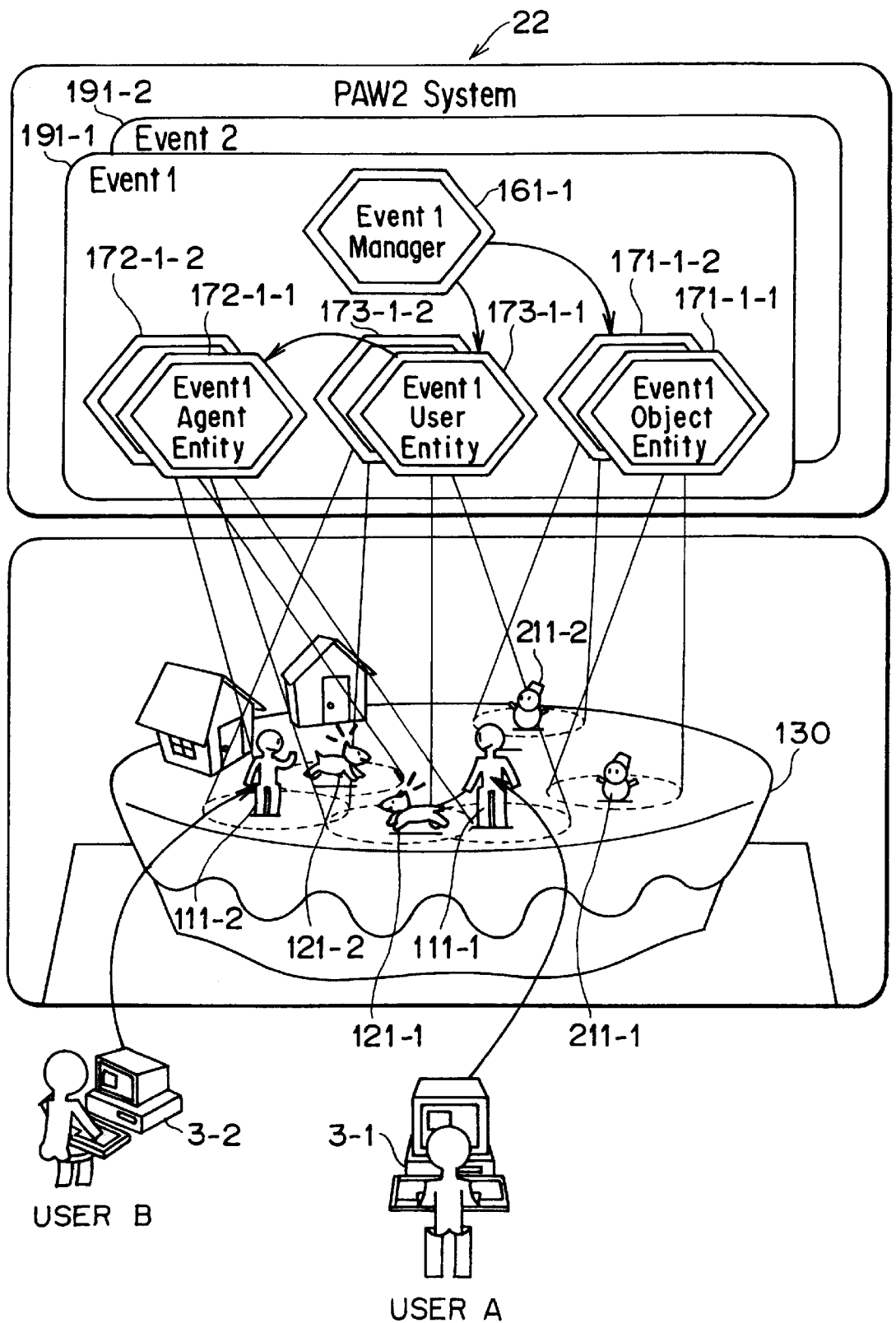
FIG. 9 is a schematic diagram illustrating processing of an event.

Referring to FIG. 9, there is schematically shown a condition in which Event 1 and Event 2 are taking place in the virtual world 130. In the AO server 22, a field 191-1 of Event 1 and a field 191-2 of Event 2 are generated. In the field 191-1, the Event 1 manager 161-1 is generated. The Event1Manager 161-1 generates Event1ObjectEntities 171-1-1 and 171-1-2, Event1AgentEntities 172-1-1 and 172-1-2, and Event1UserEntities 173-1-1 and 173-1-2. The Event1ObjectEntity 171-1-1 generates and manages a snowman object 211-1 in the virtual world 130. Likewise, the Event 1 object entity 171-1-2 generates and manages a snowman object 211-2.

The Event1AgentEntity 172-1-1 manages a relationship between the agent (dog) 121-1 of the user A (the avatar 111-1) and Event 1. Namely, processing to be executed when some operation has been executed on the agent 121-1 during the Event 1 is described in the Event1AgentEntity 172-1-1. The Event1AgentEntity 172-1-2 manages a relationship between the agent (dog) 121-2 of the user B (the avatar 111-2) and Event 1.

The Event1UserEntity 173-1-1 manages a relationship between the avatar 111-1 of the user A and Event 1 while the Event1UserEntity 173-1-2 manages a relationship between the avatar 111-2 of the user B and Event 1.

Figure 10:
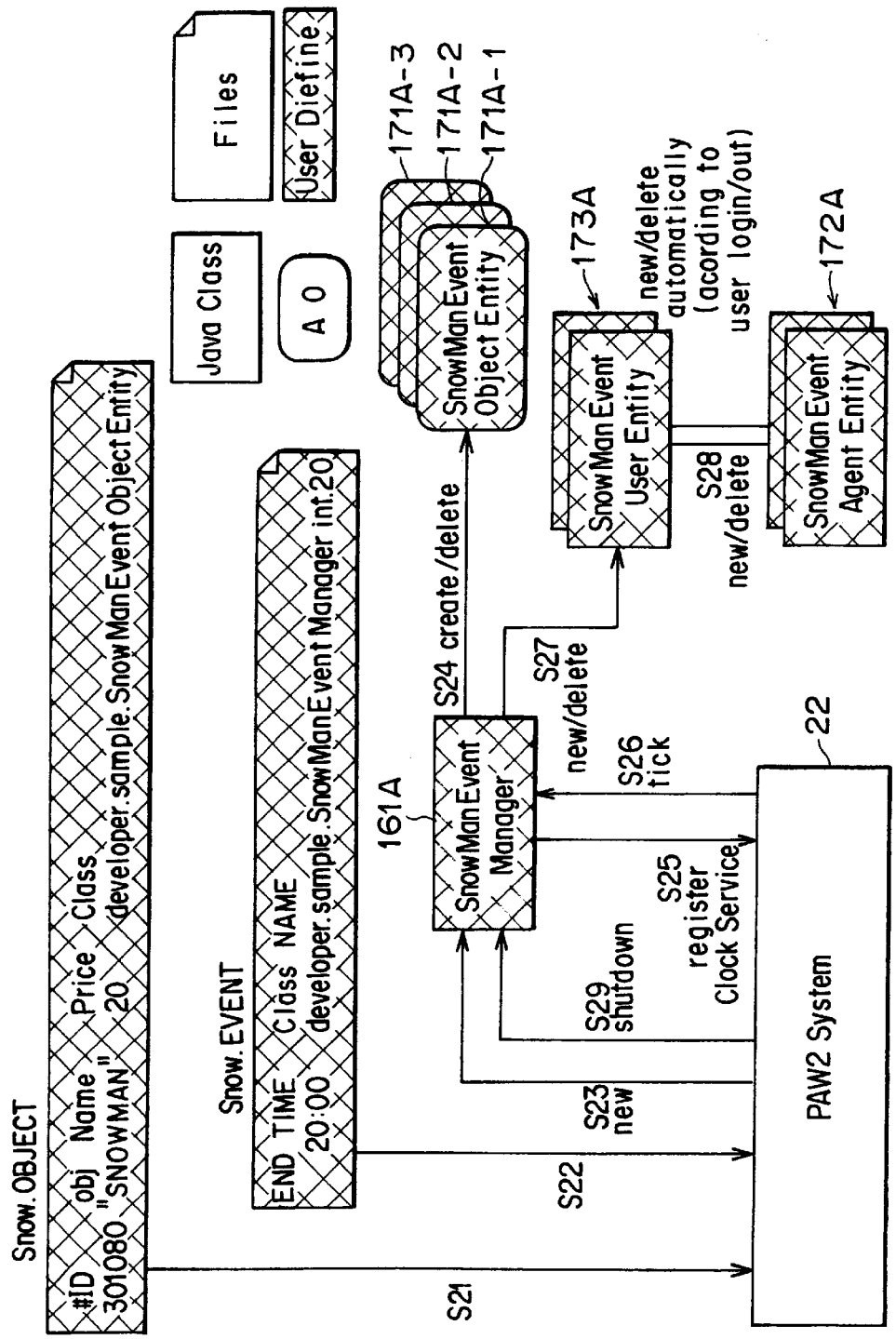
FIG. 10 is a schematic diagram illustrating an event operation.

The following describes, with reference to FIG. 10, a specific example of a flow of a process in which an event is introduced into a virtual world. In this example, an object file snow.OBJECT and an event file snow.EVENT are supplied to the server side as the object file and the event file of a configuration file generated by a general user. The object file snow.OBJECT describes an object named "snowman" having object ID (BeginID shown in FIG. 6) 301080. The price of this object is 20 poligo (the currency valid in the virtual world 130) and the name of the class file is developer.sample.SnowManEventObjectEntity.

In the event file snow.EVENT, the end time is 20:00 and the class name of EventManager to be loaded is developer.sample.SnowManEventManager. The argument to be passed to this EventManager is integer 20.

In step S21, the AO server 22 reads the object file snow.OBJECT and, in step S22, reads the event file snow.EVENT. When the event file snow.EVENT is read, the universal AO 41 immediately generates a SnowManEventManager 161A as an instance of the EventManager 161 (class) in step S23 because no event start time is specified at this point of time. In this event, the SnowManEventManager 161A generates an SnowManEventEntity 173A as the instance of an EventUserEntity 173 (class) for each user (avatar) 111 existing in the virtual world 130 in step S27. In step S28, the SnowManEventManager 161A further generates a SnowManEventAgentEntity 172A as the instance of the EventAgentEntity 172 (class) for the agent corresponding to that user. If the user logs out of the virtual world 130, the SnowmanEventManager 161A deletes the corresponding SnowManEventUserEntity 173A and SnowManEventAgentEntity 172A.

The EventManager 161 (therefore the SnowManEventManager 161A) is provided with a timer capability and a capability of deleting event objects. Assume for example that creation of three snowmen that play game with the user (the avatar 111) in the virtual world 130 every five minutes after the start of the event be described in the SnowManEventManager 161A. Then, in step S25, the SnowManEventManager 161A registers a timer of every five minutes into the AO server 22. The AO server 22 executes a counting operation by its incorporated timer and, every time five minutes pass, starts a program described in the SnowManEventManager 161A in step S26.

The started program (the SnowManEventManager 161A) generates SnowManEventobjectEntities 171A-1 through 171A-3 as the instances of the EventobjectEntity 171 (class) in step S24. These SnowManEventObjectEntities 171A-1 through 171A-3 create snowman objects 211-1 through 211-3 (in FIG. 9, the object 211-3 is not shown) respectively as shown in FIG. 9 and arrange the created objects in the virtual world 130.

SnowManEventobjectEntities 171A-1 through 171A-3 as the instances of the EventobjectEntity 171 determine the behavior of the corresponding object (snowman) in the virtual world 130. Properties such as the size, color, and shape of an object in the virtual world 130 can be set to the EventobjectEntity 171. At the same time, the EventObjectEntity 171 describes processing of a text received from the user (the avatar 111) or another object and processing to be executed when a click is received. The same holds with the EventAgentEntity 172 for controlling the agent.

Figure 11:
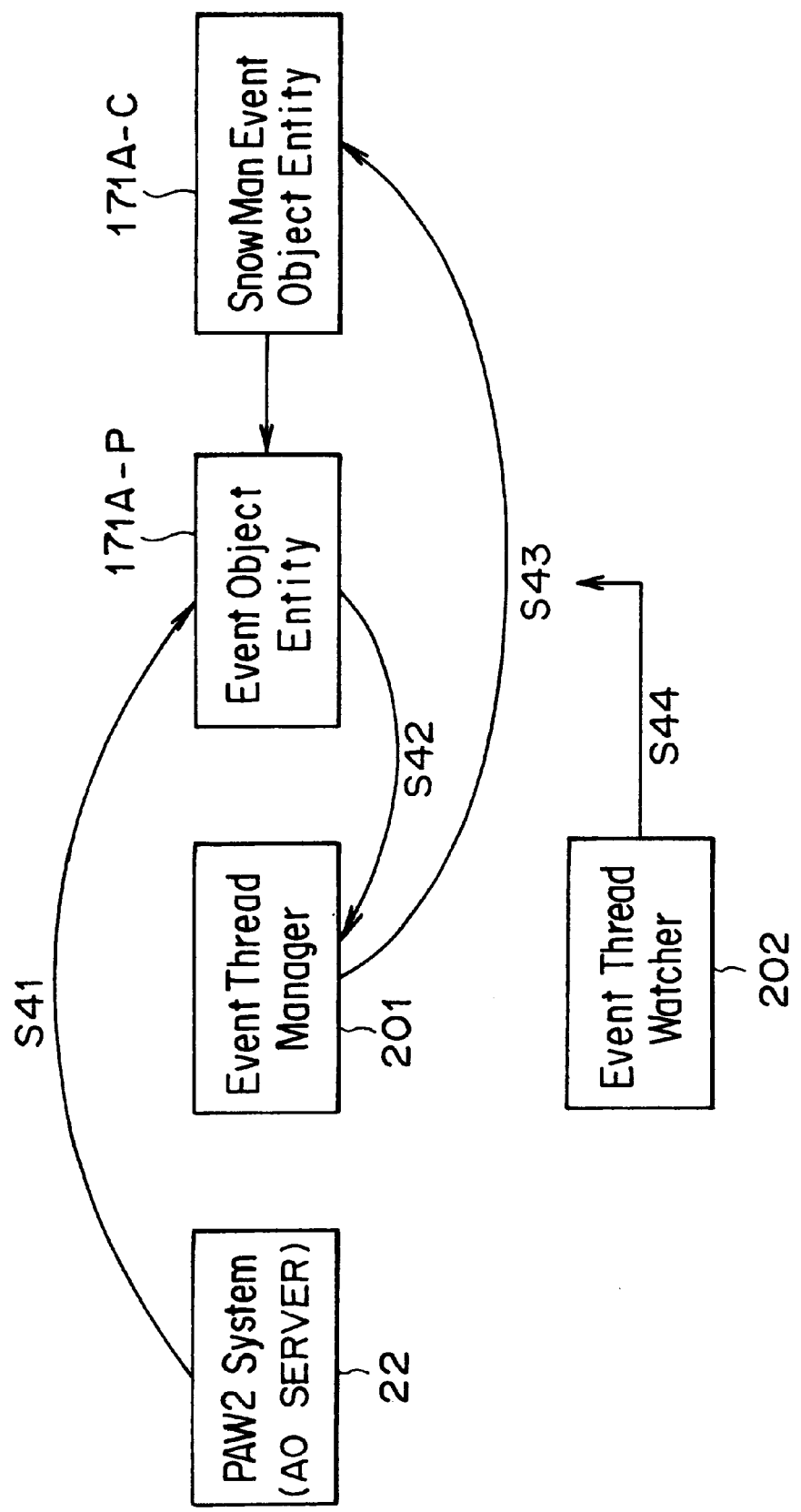
FIG. 11 is a schematic diagram illustrating operations of EventThreadManager 201 and EventThreadWatcher 202.

The following describes, with reference to FIG. 11, an operation to be executed when starting a program created by a general user by use of the case in which the user (the avatar 111) clicks a snowman for example.

When the user of the predetermined avatar 111 clicks a snowman, which is an object existing in the virtual world 130 during the event, the AO server 22 notifies in step S41 an EventObjectEntity 171A–P as an instance that the object (the snowman) has been clicked. In step S42, the EventobjectEntity 171A–P requests an event thread manager (EventThreadManager) 201 for starting a program corresponding to that object.

In response to the request, the EventThreadManager 201 starts an instance SnowManEventobjectEntity 171A–C as the program for that object in step S43. This puts the clicked snowman in a state ready for playing game with the user who clicked.

It should be noted that the SnowManEventobjectEntity 171A–C is a child and therefore inherits the property of the EventObjectEntity 171A–P as a parent.

Thus, starting the SnowManEventobjectEntity 171A–C as a child from the EventObjectEntity 171A–P as a parent through the EventThreadManager 201 can prevent an error that takes place in the event program (SnowManEventobjectEntity 171A–C) described by a general user from affecting the entire virtual world.

In addition, as shown in FIG. 11, the EventThreadManager 202 is monitoring, in step S44, the starting of the SnowManEventObjectEntity 171A–C by the EventThreadManager 201. Therefore, if a trouble takes place in operation, the server manager can detect the failing position. These points will be described later with reference to FIGS. 12 and 13.

It should be noted that, if two or more events are active at the same time, the instances of the EventUserEntity 173 are created by the number of events for each user. Because the EventUserEntity 173 of one event cannot reference the EventUserEntity 173 of another event, the information associated with the event installed by another user cannot be acquired or introduced.

The following describes the management of a thread as used in the present invention. Normally, as shown in FIG. 12 for example, when a predetermined input operation is executed like clicking of the mouse on an agent AO 81A-1 in step S41 as the thread of the AO server 22, the agent AO 81A-1 executes the corresponding processing in step S42. In step S43, the agent AO 81A-1 outputs a signal indicative of the result of the processing to a shop AO 71A-1 in a subsequent stage of the thread. In response to this signal, the shop AO 71A-1 executes corresponding processing in step S44. In step S45, the shop AO 71A-1 outputs a signal indicative of the result of this processing to a food AO 71A-2 in a subsequent stage of the thread. In response to this signal, the food AO 71A-2 executes corresponding processing in step S46 and outputs a signal indicative of the result of the processing to a subsequent stage in the thread in step 47.

Likewise, signals are sequentially outputted to subsequent stages in the thread.

It is assumed, in step S48, that a signal is inputted in a user AO 171A-1 corresponding to an event generated by a general user and the processing corresponding to that signal is executed in step S49, by way of example. If a program for executing this processing is in an infinite loop, the processing is halted here, disabling the AO server 22 to execute the subsequent processing.

To overcome such a problem, the thread is managed by the EventThreadManager 201 as described with reference to FIG. 11.

Figure 13:
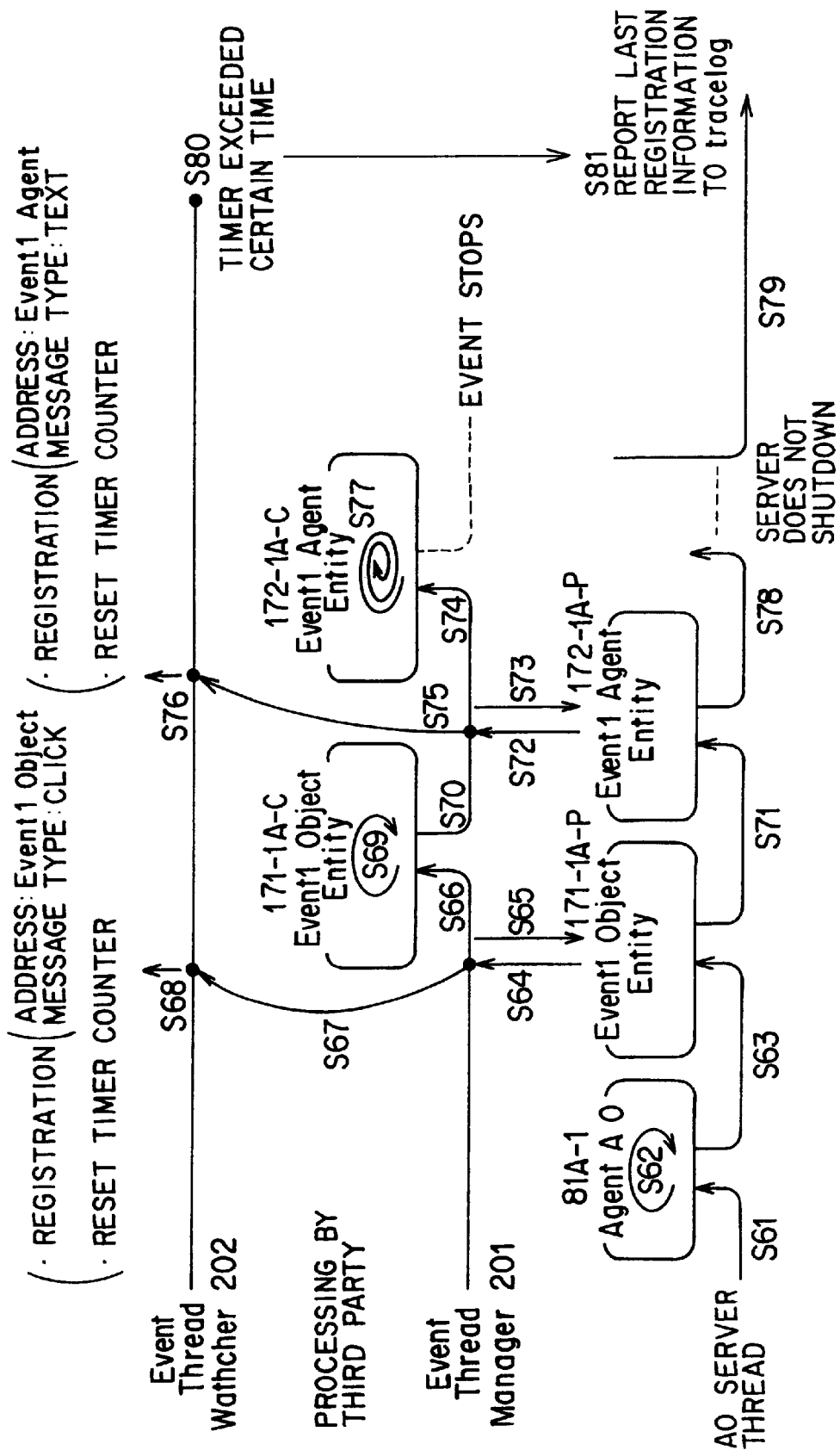
FIG. 13 is a schematic diagram illustrating another thread of the AO server 22.

To be more specific, as shown in FIG. 13, when a predetermined input is made into the agent AO 81A-1 as the thread of the AO server 22 in step S61, the agent AO 81A-1 executes a predetermined procedure in step S62. The agent AO 81A-1 is generated on the server side and therefore there is little possibility of the existence of bugs such as an infinite loop. Consequently, the agent AO 81A-1 is outside the management of the EventThreadManager 201.

In step S63, the agent AO 81A-1 outputs a signal indicative of the result of the Ad processing to an EventObjectEntity 171-1A–P in a subsequent stage of the thread. This EventObjectEntity 171-1A–P is an instance and a parent generated on the server side. Therefore, the EventObjectEntity 171-1A–P only requests the EventThreadManager 201 for the processing of its child and does not execute any substantial processing (which is executed by an EventObjectEntity 171-1A–C, which is the child). Thus, there is little possibility of the existence of bugs in the EventObjectEntity 171-1A–P.

Receiving the input, the Event1ObjectEntity 171-1A–P outputs the received input to the EventThreadManager 201 in step S64. Receiving the signal from the Event1ObjectEntity 171-1A–P, the EventThreadManager 201 returns the processing to the Event1ObjectEntity 171-1A–P in step S65.

Receiving the signal from the EventObjectEntity 171-1A–P, in step S66, the EventThreadManager 201 supplies the received signal to the EventObjectEntity 171-1A–C, to which the signal is addressed. This EventObjectEntity 171-1A–C is a child generated by the user. Besides, receiving the signal from the EventObjectEntity 171-1A–P in step S64, the EventThreadManager 201 transfers the address and type of the received signal to the EventThreadWatcher 202 in step S67. Receiving the address and type of the message from the EventThreadManager 201, the EventThreadWatcher 202 registers them internally in step S68. At the same time, the EventThreadWatcher 202 resets its internal timer counter which has counted time so far, restarting a counting operation. In this case, the address of the message signal is registered as "EventObject" and, as the message type, "Click" is registered for example.

Receiving the message, the Event1ObjectEntity 171-1A–C processes the received message in step S69. In step S70, the EventThreadManager 201 waits until a message indicative of the result of the processing comes from the Event1ObjectEntity 171-1A.

On the other hand, receiving the sequence of the processing from the EventThreadManager 201 in step S65, the Event1ObjectEntity 171-1A–P outputs the received sequence of processing to an Event1AgentEntity 172-1A–P in a subsequent stage of the thread in step S71. Receiving the message from the Event1ObjectEntity 171-1A–P, the Event1AgentEntity 172-1A–P outputs the received message to the EventThreadManager 201 in step S72. Receiving the message from the Event1AgentEntity 172-1A–P, the EventThreadManager 201 returns the sequence of processing to the Event1AgentEntity 172-1A–P in step S73. Receiving the sequence of processing from the EventThreadManager 201 in step S73, the Event1AgentEntity 172-1A–P outputs the message to a subsequent stage in the thread in step S78.

Receiving the message from the Event1AgentEntity 172-1A–P in step S72, the EventThreadManager 201 waits until the message comes from the Event1ObjectEntity 171-1A–C. Receiving both the messages, the EventThreadManager 201 transfers them to the Event1AgentEntity 172-1A–C in step S74, the address of these messages. When the EventThreadManager 201 receives the message from the Event1AgentEntity 172-1A–P in step S72, the EventThreadManager 201 transfers the address and type of the received message to the EventThreadWatcher 202 in step S75. Receiving the address and type of message, the EventThreadWatcher 202 registers them internally in step S76. In this example, "Event1Agent" is registered as the address and "text" is registered as the message type for example. In step S76, the EventThreadWatcher 202 resets the internal timer counter which was reset and restarted in step S68, restarting a count operation.

Receiving the message, the Event1AgentEntity 172-1A–C executes the processing corresponding to the received message in step S77. If, at this point of time, this Event1AgentEntity 172-1A–C has a bug, putting the internal processing in an infinite loop, the event processing stops here. When the timer counter which was reset and then restarted has counted up a predetermined preset time (for example, five minutes) in step S76, the EventThreadWatcher 202 notifies the trace log 181 of the last registration information in step S80. Namely, in this case, "Event1Agent" as the address and "text" as message type registered in step S76 are registered in the trace log 181. This allows the manager to know where the bug was caused in the event. Consequently, the manager appropriately notifies the event provider thereof for improvement.

As described, the thread processing shown in the lower portion in FIG. 13 is executed only by the program provided from the server side, thereby making it seldom for the processing to be discontinued by a bug or other causes.

Figure 14:
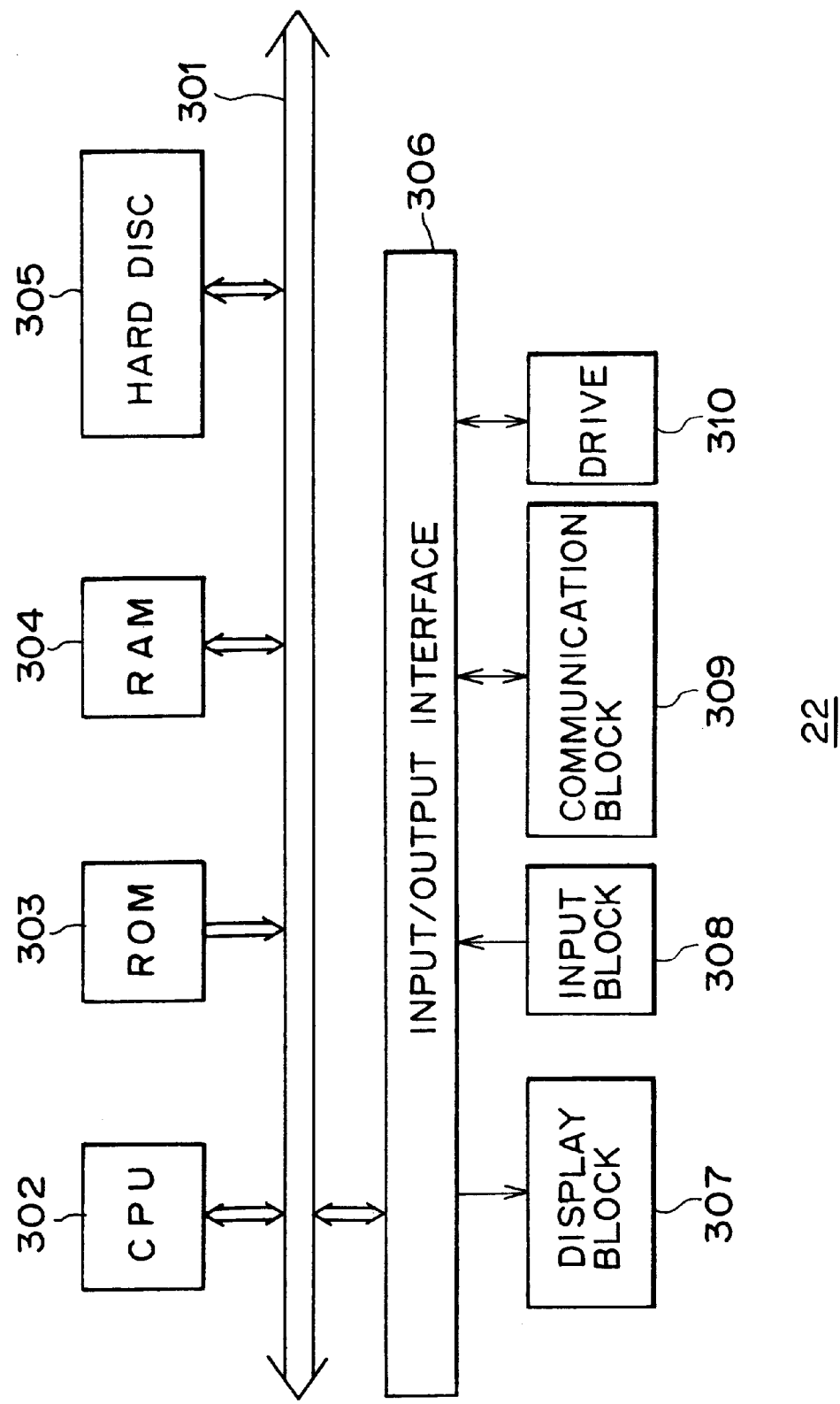
FIG. 14 is a block diagram illustrating an exemplary internal configuration of the AO server 22 shown in FIG. 1.

Referring to FIG. 14, there is shown an exemplary configuration of the hardware of the AO server 22. A CPU (Central Processing Unit) 302 executes various processing operations according to a program stored in a ROM (Read Only Memory) 303. A RAM (Random Access Memory) 304 stores programs and data necessary for the CPU 302 to execute various processing operations. A hard disc 305 stores a database, other necessary data, and programs to be executed by the CPU 302. These storage devices are interconnected by a bus 301.

The bus 301 is also connected to an input/output interface 306. The input/output interface 306 has a display block 307 composed of an LCD (Liquid Crystal Display) and a CRT (Cathode Ray Tube), an input block 308 composed of a keyboard, a mouse, and a microphone, and a modem. The input/output interface 306 is also connected to a communication block 309 for making communication with external devices through a general telephone line, a leased line, or the Internet and a drive 310 for driving discs such as floppy disc, optical disc, and magneto-optical disc for transferring data.

It should be noted that the WWW server 1 and the terminal 3, of which details are not shown, are also basically configured in generally the same manner as the AO server 22.

The following describes, with reference to FIGS. 15A, 15B, and 15C, recording media from which the programs for executing the above-mentioned sequence of processing operations are installed into a computer, which is a general-purpose personal computer.

As shown in FIG. 15A, the programs can be provided as stored in a hard disc 322 (corresponding to the hard disc 305 shown in FIG. 14) incorporated in a personal computer 321 as a recording medium or as stored in a semiconductor memory 323.

Alternatively, as shown in FIG. 15B, the programs can be provided, as package software, as stored temporarily or permanently in such recording media as a floppy disc 331, a CD-ROM (Compact Disc-Read Only Memory) 332, an MO (Magneto-Optical) disc 333, a DVD (Digital Versatile Disc) 334, a magnetic disc 335, and a semiconductor memory 336.

Still alternatively, as shown in FIG. 15C, the programs can be downloaded from a download site 341 into the hard disc 322 for example in the personal computer 321 through a communication satellite 342 for digital satellite broadcasting in a wireless manner or through a network 351 such as a local area network or the Internet in a wired manner.

It should be noted that the recording media herein denote a wide concept that includes all of the above-mentioned recording media.

It should also be noted that the steps in which each program provided in the above-mentioned recording media include not only those processing operations which are executed in the described sequence in a time-dependent manner but also those processing operations which are not always executed in a time-dependent manner but are executed in parallel with each other or individually.

It should be noted that the system herein denotes an entire entity composed of two or more apparatuses.

As described and according to the information processing apparatus as recited in claim 1 appended hereto, the information processing method as recited in claim 10 appended hereto, and the recording media recited in claim 11 appended hereto, basic information is captured and, on the basis of the captured basic information, events are managed. The novel constitution allows general users to provide various kinds of events into a shared virtual space with simplicity and reliability, thereby rendering the shared virtual space various and changeful without increasing the load of virtual space providers.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus for providing a virtual space to be shared by a plurality of users, comprising:

basic information capturing means for capturing basic information associated with said virtual space;

event managing means for managing an event in said virtual space, said event managing means being generated in response to one of the plurality of users generating a configuration file containing basic information of an event and providing the configuration file to said basic information capturing means; and generating means for generating said event managing means on the basis of said basic information captured by said basic information capturing means.

2. The information processing apparatus according to claim 1, wherein said event managing means comprising:

first means for executing predetermined processing on said virtual space; and second means for managing a request for said first means to execute said predetermined processing.

3. The information processing apparatus according to claim 1, wherein said event managing means further generating relationship managing means for managing a relationship between an object existing in said virtual space and said event.

4. The information processing apparatus according to claim 3, wherein said relationship managing means having first relationship managing means for managing a relationship between an avatar, which symbolizes each of said plurality of users, and said event and second relationship managing means for managing a relationship between an agent for said avatar and said event.

5. The information processing apparatus according to claim 1, wherein said event managing means further comprising object managing means for generating a new object in said virtual space during said event and managing said new object.

6. The information processing apparatus according to claim 1, further comprising:

thread managing means for managing a thread of said event independently of a thread of an event other than said event.

7. The information processing apparatus according to claim 6, further comprising:

holding means for holding thread history information of said thread managing means.

8. The information processing apparatus according to claim 7, further comprising:

detecting means for detecting last history information held in said holding means if processing of said event has not been executed after passing of a predetermined preset time.

9. The information processing apparatus according to claim 1, wherein said basic information includes time information associated with a time in which said event exists in said virtual space and said generating means generates said event managing means on the basis of said time information.

10. An information processing method for an information processing apparatus for providing a virtual space to be shared by a plurality of users, comprising:

capturing basic information associated with said virtual space;

managing an event in said virtual space, said event managing being executed in response to one of the plurality of users generating a configuration file containing basic information of an event and providing the configuration file to be captured; and generating the event managing step on the basis of said basic information captured in said basic information capturing step.

11. An information recording medium for having a computer execute a program for information processing for providing a virtual space to be shared by a plurality of users, said program comprising the steps of:

capturing basic information associated with said virtual space;

managing an event in said virtual space, said event managing being executed in response to a one of the plurality of users generating a configuration file containing basic information of an event and providing the configuration file to be captured; and generating the event managing step on the basis of said basic information captured in said basic information capturing step.

* * * * *